US009487166B2

(12) United States Patent
Loison et al.

(10) Patent No.: US 9,487,166 B2
(45) Date of Patent: Nov. 8, 2016

(54) AIRCRAFT ELECTRICAL SYSTEM AND ASSOCIATED MANAGEMENT METHOD

(71) Applicant: DASSAULT AVIATION, Paris (FR)

(72) Inventors: Renaud Loison, Paris (FR); Olivier Savin, Suresnes (FR)

(73) Assignee: DASSAULT AVIATION, Paris (FR)

( * ) Notice: Subject to any disclaimer, the term of this patent is extended or adjusted under 35 U.S.C. 154(b) by 721 days.

(21) Appl. No.: 13/871,404

(22) Filed: Apr. 26, 2013

(65) Prior Publication Data
US 2013/0285443 A1 Oct. 31, 2013

(30) Foreign Application Priority Data
Apr. 27, 2012 (FR) .................................. 12 01247

(51) Int. Cl.
B60R 16/033 (2006.01)
H02J 3/38 (2006.01)
H02J 15/00 (2006.01)

(52) U.S. Cl.
CPC ............ B60R 16/033 (2013.01); H02J 3/387 (2013.01); H02J 15/00 (2013.01); B64D 2221/00 (2013.01)

(58) Field of Classification Search
CPC ....... H02J 3/387; H02J 15/00; B60R 16/033; B64D 2221/00
USPC ......................................................... 307/9.1
See application file for complete search history.

(56) References Cited

U.S. PATENT DOCUMENTS

| 2004/0028966 A1* | 2/2004 | Hibbs ............... H01M 8/04097 429/410 |
| 2005/0188689 A1 | 9/2005 | Juby et al. |
| 2008/0138675 A1 | 6/2008 | Jang et al. |
| 2008/0150356 A1* | 6/2008 | Breit ..................... H02J 7/1423 307/9.1 |
| 2008/0174177 A1* | 7/2008 | Langlois .................. H02J 1/08 307/9.1 |
| 2009/0157234 A1 | 6/2009 | Breit et al. |
| 2009/0302153 A1 | 12/2009 | Matasso et al. |
| 2010/0078938 A1 | 4/2010 | Coons et al. |
| 2010/0304246 A1 | 12/2010 | Watanabe et al. |
| 2012/0308906 A1* | 12/2012 | Paganelli .......... H01M 8/04097 429/415 |

FOREIGN PATENT DOCUMENTS

| EP | 2 070 817 A2 | 6/2009 |
| EP | 2 070 817 A3 | 6/2009 |
| EP | 2 168 868 A2 | 3/2010 |
| EP | 2 256 851 A1 | 12/2010 |
| WO | WO 2012/012482 A1 | 1/2012 |

OTHER PUBLICATIONS

French Preliminary Search Report issued Jan. 21, 2013, in French 1201247, filed Apr. 27, 2012 (with English Translation of Categories of Cited Documents).

* cited by examiner

Primary Examiner — Rexford Barnie
Assistant Examiner — Toan Vu
(74) Attorney, Agent, or Firm — Oblon, McClelland, Maier & Neustadt, L.L.P.

(57) ABSTRACT

The system according to the invention comprises: an electrical network, and a regulating assembly. The regulating assembly includes a secondary electric power source, a conversion assembly for an additional electric power injected on the electrical network, the conversion assembly being able, in a first configuration, to consume the additional electric power present on the network to create a supply fluid of the secondary source. The assembly includes a reservoir for each supply fluid, to collect the supply fluid produced by the conversion assembly.

13 Claims, 3 Drawing Sheets

AIRCRAFT ELECTRICAL SYSTEM AND ASSOCIATED MANAGEMENT METHOD

The present invention relates to an aircraft electrical system, comprising:
- an electrical network, designed to electrically power at least one functional equipment of the aircraft;
- a regulating assembly capable of maintaining a desired electrical power on the electrical network, the desired electrical power being provided by at least one electricity generating assembly of the aircraft.

Such a system is designed to be used on an aircraft including a plurality of electrical equipment intended for its operation, in particular for piloting, navigation, or to condition the cabin and ensure passenger comfort on the aircraft.

This equipment for example comprises flight control computers, pumps, navigation instruments, which may be present in the cockpit, the cabin and/or the cargo hold. In particular, on modern aircrafts, this equipment comprises logistical support such as electromechanical actuators, for example designed to move flying controls, such as control surfaces or flaps, or designed to actuate the landing systems of the aircraft (opening/closing hatches, deploying/retracting gear and, optionally, electrical driving of the gear for its ground movement function).

Known aircrafts, such as the Airbus A380, the Boeing 787, the Airbus A350, increasingly incorporate this type of electrical equipment. The presence of this electrical equipment optimizes the operation of the aircraft, increases its reliability, reduces mass, and decreases the consumption of the aircraft.

The use of this equipment is therefore generally very satisfactory, although it does create new difficulties.

In particular, in certain operating conditions, active equipment such as the electromechanical actuators may inject electrical power on the network of the aircraft.

This is in particular the case for electric motors of the electromechanical actuators that cannot operate in motor mode only. Thus, when they enter a generator mode, for example when the actuator returns to idle position, this type of actuator delivers electrical power that is not necessarily directly usable by the electrical network of the aircraft.

To avoid disrupting the other electrical equipment connected to the network, the regenerated power is dissipated in the form of heat. To that end, the converter managing the power of any equipment that may operate in generator mode includes a dissipating (or braking) resistance to consume the regenerated power and limit or avoid the injection of that power on the electrical network.

Such a solution is not fully satisfactory. In fact, the dissipating resistance must be precisely sized as a function of dynamic and electric characteristics of the actuator, and in particular as a function of the instantaneous and average power to be dissipated, as well as the maximum discharge time that guarantees the return of the voltage of the network to a satisfactory level. Furthermore, the dissipating resistance must be capable of dissipating the stored energy more quickly than that which is regenerated by the actuator.

To meet these constraints, certain pieces of electrical equipment must be provided with an additional regulating device, which adds to the complexity in terms of regulation, bulk and mass.

In all cases, the presence of the dissipating resistance, which dissipates electrical power in the form of heat not usable in the aircraft, causes an inevitable loss of electrical output on the electrical network.

One aim of the invention is therefore to provide an aircraft electrical system in which the electrical power present on the network is regulated reliably, even in the case of unwanted power injection, and which nevertheless makes it possible to improve the electrical output of the aircraft.

To that end, the invention relates to a system of the aforementioned type, characterized in that the regulating assembly includes:
- a secondary electrical power source;
- a conversion assembly for additional electrical power injected on the electrical network, the conversion assembly being able, in a first electrical regulating configuration, to consume the additional electrical power present on the electrical network to create at least one supply fluid for the secondary source;
- a reservoir for each supply fluid, inserted between the conversion assembly and the secondary source to collect the supply fluid produced by the conversion assembly.

The system according to the invention may comprise one or more of the following features, considered alone or according to all technically possible combinations:
- the secondary source is formed by a fuel cell;
- the secondary source is electrically connected to the electrical network to reinject, on the electrical network, additional electrical power produced from the or each supply fluid in the second electrical regulating configuration;
- the regulating assembly can be driven between:
    - a standby configuration, in which the secondary source is supplied by a first supply fluid flow rate coming from each reservoir to produce a first standby electrical power;
    - the first regulating configuration, and
    - the second regulating configuration, and in the second regulating configuration, the secondary source is supplied by a second supply fluid flow rate coming from each reservoir, the second flow rate being higher than the first flow rate to produce a second electrical regulating power higher than the first standby electric power;
- the conversion assembly is capable of producing at least two supply fluids of the secondary source, the system including a separate reservoir for each supply fluid;
- the conversion assembly includes an electrolyzer;
- it includes a functional equipment connected to the electrical network, the functional equipment being capable of switching between an active state, in which it withdraws electric power on the network, and a regenerating state, in which it injects additional electric power on the electric network;
- the functional equipment is chosen from among an actuator, in particular an electromechanical actuator, the actuator advantageously being designed to move flying controls, such as control surfaces or flaps, or being designed to actuate landing systems of the aircraft such as the opening/closing of hatches, the deployment/retraction of the landing gear or the electric driving of the landing gear for its ground movement function;
- the regulating assembly includes, between each reservoir and the secondary source, a regulating member for the supply fluid flow rate distributed from the reservoir toward the secondary source;
- it includes a main electricity generating assembly advantageously comprising a generator rotated by the turbine of an aircraft engine or by a gas stream created by an aircraft engine;

it includes an auxiliary electricity generating assembly connected to the electrical network, the auxiliary assembly being capable of creating backup electrical energy independently of the or each main electrical generator associated with one or the aircraft engine(s)

the regulating assembly is able to be driven such that in the standby configuration, the flow rate of the or each supply fluid produced by the conversion assembly substantially corresponds to the flow rate of the or each supply fluid consumed by the secondary source.

The invention also relates to an electricity management method for an aircraft comprising the following steps:

maintaining a desired electrical power on the electrical network by a regulating assembly, the desired electrical power being provided by at least one electricity generating assembly of the aircraft;

supplying electricity for at least one functional equipment of the aircraft electrically connected to the electrical network, characterized in that the method includes the following phases:

injecting additional electrical power on the electrical network;

consuming the additional electric power present on the electrical network by a conversion assembly electrically connected to the electrical network to create at least one supply fluid for a secondary electric power source;

storing the or each supply fluid of the secondary source in at least one reservoir.

The method according to the invention may comprise one or more of the following features, considered alone or according to all technically possible combinations:

during the supply step, the functional equipment is in an active state, in which it withdraws electric power from the electrical network, and during the injection step, the functional equipment is in a regenerating state wherein it injects the additional electric power on the electrical network;

it includes a step for reinjecting additional electric power on the electrical network through a secondary electric power source, the reinjection step including providing at least one supply fluid coming from each reservoir to the secondary source, producing electric power from each supply fluid by the secondary source, and injecting the electric power produced by the secondary source on the electrical network;

the secondary source is formed by a fuel cell, the production of electric power resulting from the generation of an electron current in the fuel cell;

in a first reinjection step, the secondary source is supplied by a first supply fluid flow rate coming from each reservoir and produces a first standby electric power, and in the second reinjection step, the secondary source is supplied by a second supply fluid flow rate coming from each reservoir, the second flow rate being higher than the first flow rate to produce a second electric regulating power higher than the first electric standby power, in the first reinjection step, the flow rate of the or each supply fluid produced by the conversion assembly substantially corresponds to the flow rate of the or each supply fluid consumed by the secondary source.

The invention will be better understood upon reading the following description, which is provided solely as an example and done in reference to the appended drawings, in which.

Figure 1:
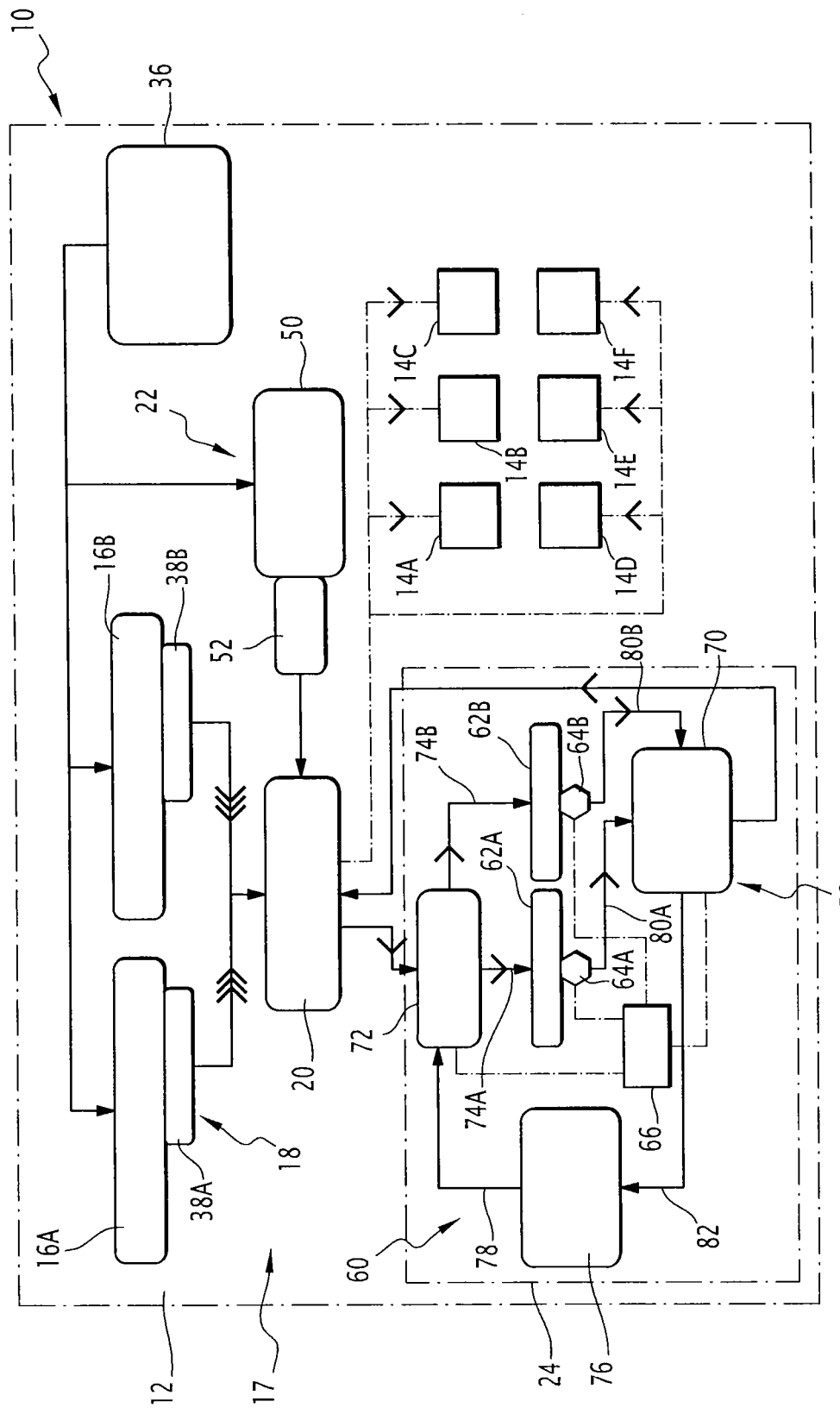
FIG. 1 is a block diagram of a first aircraft provided with an electrical system according to the invention, provided with a regulating assembly operating in a standby configuration.

A first aircraft 10 according to the invention is diagrammatically illustrated in FIG. 1.

In a known manner, the aircraft 10 includes a fuselage 12 delimiting an enclosure for receiving occupants, functional equipment 14A to 14F of the aircraft 10, and optionally baggage and/or cargo.

The aircraft 10 also comprises at least one engine 16A, 16B, and electrical systems 17 designed to electrically power the functional equipment 14A to 14F.

The electrical system 17 includes a main assembly 18 for generating electricity coupled to at least one engine 16A, 16B, and an electrical network 20 connected to the main assembly 18.

Advantageously, the electrical system 17 also includes an auxiliary assembly 22 for generating electricity connected to the network 20. It also includes a power regulating assembly 24.

According to the invention, and as will be seen below, the regulating assembly 24 is capable of absorbing additional electric power injected on the electrical network 20, storing the absorbed electric power in the form of at least one supply fluid of the secondary electric power source, and reinjecting, if necessary, complementary electric power produced by the secondary source on the electrical network 20.

The fuselage 12 delimits a cockpit designed to carry a crew piloting the aircraft 10, a cabin designed to carry passengers and/or cargo, and a cargo hold.

The cockpit, the cabin, and the cargo hold are electrically connected to the electrical network 20 to supply electricity to the electrical equipment 14A, 14F that they contain.

The electrical network 20 is designed to electrically power the functional assemblies of the aircraft 10 including the equipment 14A to 14F.

The equipment 14A to 14F is in particular a flight control computer, pumps, navigational instruments, and utilities present in the cockpit, the cabin and/or the cargo hold.

At least one equipment 14A to 14F has an active state, in which it withdraws electric energy from the network 20 so as to perform an action, and a power regenerating state, in which it provides electric power to the electric network 20. This power reinjected on the network 20 constitutes additional electric power relative to that already present on the network 20.

The equipment 14A to 14F is for example an actuator, such as an electromechanical actuator (EMA).

Such an electrochemical actuator operates in a motor mode in the active state to move the control member from an idle position to an active position, and in a generator mode in the regeneration state, for example when a control member is returned to the idle position.

In the regeneration state, the equipment 14A to 14F delivers electric power to the network 20.

The electric power delivered to the network 20 by the equipment 14A to 14F between the takeoff and landing of the aircraft is for example greater than 100 W for a period of more than 900 s.

The electric power delivered to the network 20 by the equipment 14A to 14F having a power regenerating state is maximal during the intense usage phases of the flying controls (takeoff, landing and passing through turbulent areas), as well as during the deployment phases of the landing system (hatches and gear).

Each engine 16A, 16B is designed to propel the aircraft 10, in particular to enable the takeoff thereof and the maintenance in flight away from the ground.

In the example illustrated in FIG. 1, the aircraft 10 includes a least two engines 16A, 16B, the number of engines 16A, 16B more generally being able to be comprised between 1 and 4.

In this example, each engine 16A, 16B is a turbojet engine comprising a turbine rotated by the combustion of a liquid fuel (such as kerosene) to create thrust.

To that end, each engine 16A, 16B is connected to at least one liquid fuel reservoir 36.

In the example illustrated in FIG. 1, the main electrical generating assembly 18 includes a generator 38A, 38B including at least one rotor (not shown) rotated by the turbine of an engine 16A, 16B or by a gas stream created by the engine 16A, 16B. The generator 38A, 38B includes a stator.

The generator 38A, 38B is thus capable of producing electric energy during the rotation of the turbine of the engine 16A, 16B, on the ground or in flight.

Each generator 38A, 38B is electrically connected to the electrical network 20 to provide the electric energy that it produces to the network 20.

The auxiliary assembly 22 is for example formed by an independent electrical generating system 50, capable of generating backup electric energy independently of each electric generator 38A, 38B coupled to each engine 16A, 16B. The independent system 50 is capable of creating electric energy in particular when each engine 16A, 16B is stopped.

The system 50 includes an auxiliary generator 52, supplied with liquid fuel for example from the reservoir 36, or from an independent reservoir (not shown).

The auxiliary generator 52 generally includes a rotary shaft (not shown) and a power turbine capable of rotating the rotary shaft under the effect of the compressed gas in the combustion chamber supplied by the fuel.

Such a system 50 is for example described in the French patent no. 11 01512 and no. 11 01511 by the Applicant.

The auxiliary assembly 22 is thus capable of supplying electric energy to the network 20 independently of the electric energy provided by the main assembly 18, and in particular in the absence of electric energy provided by the main assembly 18, for example when the engines 16A, 16B are stopped or as a complement thereto.

Advantageously, the auxiliary assembly 22 is also capable of conditioning the atmosphere present in the enclosure, as described in the aforementioned applications by the Applicant.

According to the invention, the regulating assembly 24 includes a secondary electric power source 58, an assembly 60 for converting an additional electric power injected on the network 20, the conversion assembly 60 being able to consume the additional electric power to create at least one supply fluid of the secondary source 58.

For each supply fluid created by the conversion assembly 60, the regulating assembly 24 also includes a storage reservoir 62A, 62B for storing that fluid.

The regulating assembly 24 also includes a member 64A, 64B for regulating the flow rate inserted between each reservoir 62A, 62B and source 58, and a control unit 66 connected to the conversion assembly 60, each member 64A, 64B, and the secondary source 58 to drive the regulation.

In this example, the secondary source 58 is a fuel cell 70.

In a known manner, the fuel cell 70 receives a gaseous reducing supply fluid of a gaseous oxidizing supply fluid that are respectively oxidized on a first electrode of a second electrode of the cell 70. The oxidation reduction of the reducing fluid and of the oxidizing fluid produces electrons that circulate from the first electrode to the second electrode. In general, the electrodes are mounted on either side of a proton exchange membrane or on a solid oxide membrane.

The reducing fluid is for example hydrogen and the oxidizing fluid is for example oxygen.

The reaction between the oxidizing and reducing fluids produces an output fluid, in particular a liquid such as water.

The fuel cell 70 is electrically connected to the electrical network 20.

In this example, the conversion assembly 60 includes an electrolyzer 72 designed to produce, from a starting fluid (for example, water), the or each supply fluid, and for each supply fluid produced by the electrolyzer 72, an outlet duct 74A, 74B emerging in a respective storage reservoir 62A, 62B for that fluid.

The conversion assembly 60 also includes a starting fluid reservoir 76 and an upstream supply duct 78 supplying the electrolyzer 72 with starting fluid.

The electrolyzer 72 is electrically connected to the electrical network 20. When the electrolyzer 72 is electrically powered by the electrical network 20, it is capable of electrolyzing the starting fluid from the reservoir 76 through the upstream duct 78 to form each supply fluid.

In the example shown in FIG. 1, the electrolyzer 72 is designed to form an oxidizing fluid and a reducing fluid, the oxidizing fluid and the reducing fluid being capable of reacting in the secondary source 58 to create electric power.

Each reservoir 62A, 62B is connected to the electrolyzer 72 by means of a respective output duct 74A, 74B. It is further connected to the source 58 by a respective downstream duct 80A, 80B. The source 58 is connected to the starting fluid reservoir by a discharge duct 82.

The volume of each outlet duct 74A, 74B and each downstream of duct 80A, 80B is smaller than the volume of the reservoir 62A, 62B to which it is connected.

As an example applied to the field of business planes (with maximum takeoff masses below 100,000 pounds), the volume of each reservoir 62A, 62B is comprised between 1 $dm^3$ and 10 $dm^3$.

Each reservoir 62A, 62B is advantageously formed by an enclosure capable of receiving a supply fluid pressure comprised between 0.15 absolute bars (during flight, in the case of non-pressurized conditioning of the reservoirs) and 60 absolute bars.

Each downstream duct 80A, 80B is provided with a respective regulating member 64A, 64B, positioned between the reservoir 62A, 62B and the secondary source 58.

Each regulator member 64A, 64B is capable of allowing the passage of an adjustable supply fluid flow rate from the reservoir 62A, 62B to the secondary source 58.

The unit 66 can drive the operation of the electrolyzer 72 and the secondary source 58. It is capable of regulating the supply fluid flow rate supplying the secondary source 58 by means of the regulating members 64A, 64B.

The regulating assembly 24 can be driven between an interactive configuration, an intermediate standby configuration, a first regulating configuration to withdraw electric power from the network 20, and a second regulating configuration to reinject electric power on the network 20.

In the inactive configuration, the secondary source 58 is inactive and does not produce any electric energy. The electrolyzer 72 is also inactive.

In the intermediate standby configuration, the conversion assembly 60 is electrically powered by the electrical network 20 to produce a sufficient supply fluid flow rate to keep the secondary source 58 under operational conditions.

In this configuration, the source 58 produces a first standby electric power P1, advantageously less than 100 W, which is restored to the electrical network 20.

In the first regulating configuration, the conversion assembly 60 is activated to withdraw excess electric power on the network 20 and to produce each supply fluid from the fluid to be electrolyzed so that it can be stored in a reservoir 62A, 62B.

In the second regulating configuration, each reservoir 62A, 62B supplies the secondary source 58 to produce energy restored to the electrical network 20 with a second electric power P2 higher than the standby electric power P1.

The operation of the electrical system 17 according to the invention will now be described.

Initially, on the ground, when the aircraft 10 is parked, the main electrical generating assembly 18, the auxiliary assembly 22 and the regulating assembly 24 are inactive.

Then, before an engine 18A, 18B is started, the auxiliary assembly 22 is used to produce electric energy provided to the network 20.

To that end, liquid fuel is supplied to the auxiliary generator 52 from the reservoir 36. The combustion of the fuel in a combustion chamber (not shown) drives a Rotary shaft the produces electric energy.

When at least one engine 16A, 16B is started, the engine 16A, 16B rotates the rotor of the generator 38A, 38B to which it is coupled. This allows the main assembly 18 to produce a desired reference electric power. The selector power is transmitted to the network 20 to power the various pieces of equipment 14A to 14F present in the functional assemblies of the aircraft, for example in the cockpit, the cabin and/or the cargo hold.

The regulating assembly 24 is then placed in its standby configuration illustrated by FIG. 1.

In this configuration, the conversion assembly 60 withdraws a low electric power on the electrical network 20, for example less than 200 W.

Starting fluid is withdrawn from the reservoir 76 and brought to the electrolyzer 72 to produce each supply fluid of the secondary source 58.

Each supply fluid produced by the assembly 60 is conveyed to a respective reservoir 62A, 62B.

Furthermore, the regulating members 64A, 64B are partially open to supply the secondary source 58 with supply fluid through the respective ducts 80A, 80B.

An oxidation-reduction reaction occurs then in the cell 70 between the oxidizing and reducing fluids to create an electron current that is transmitted to the electrical network 20.

The obtained liquid is conveyed to the reservoir 76 through the discharge duct 82.

Advantageously, the source 58 produces a standby electric power continuously during the flight of the aircraft, which guarantees that the source 60 operates, that it is kept at a temperature, for example at a temperature above 60° C., so as to be kept under operational conditions.

The standby electric power P1 provided by the source 58 is, however, kept at the minimum, for example below 100 W to limit the electric power that the electrical network 20 must provide to supply the conversion assembly 60.

The regulator members 64A and 64B are calibrated so that, in this configuration, the flow rate of each supply fluid produced by the conversion assembly 60 substantially corresponds to the flow rate d1 of each supply fluid consumed by the secondary source 58. As a result, in this configuration there is no pressure variation in the reservoirs 62A, 62B.

A desired reference electric power is thus maintained on the electrical network 20 by the regulating assembly 24.

Figure 2:
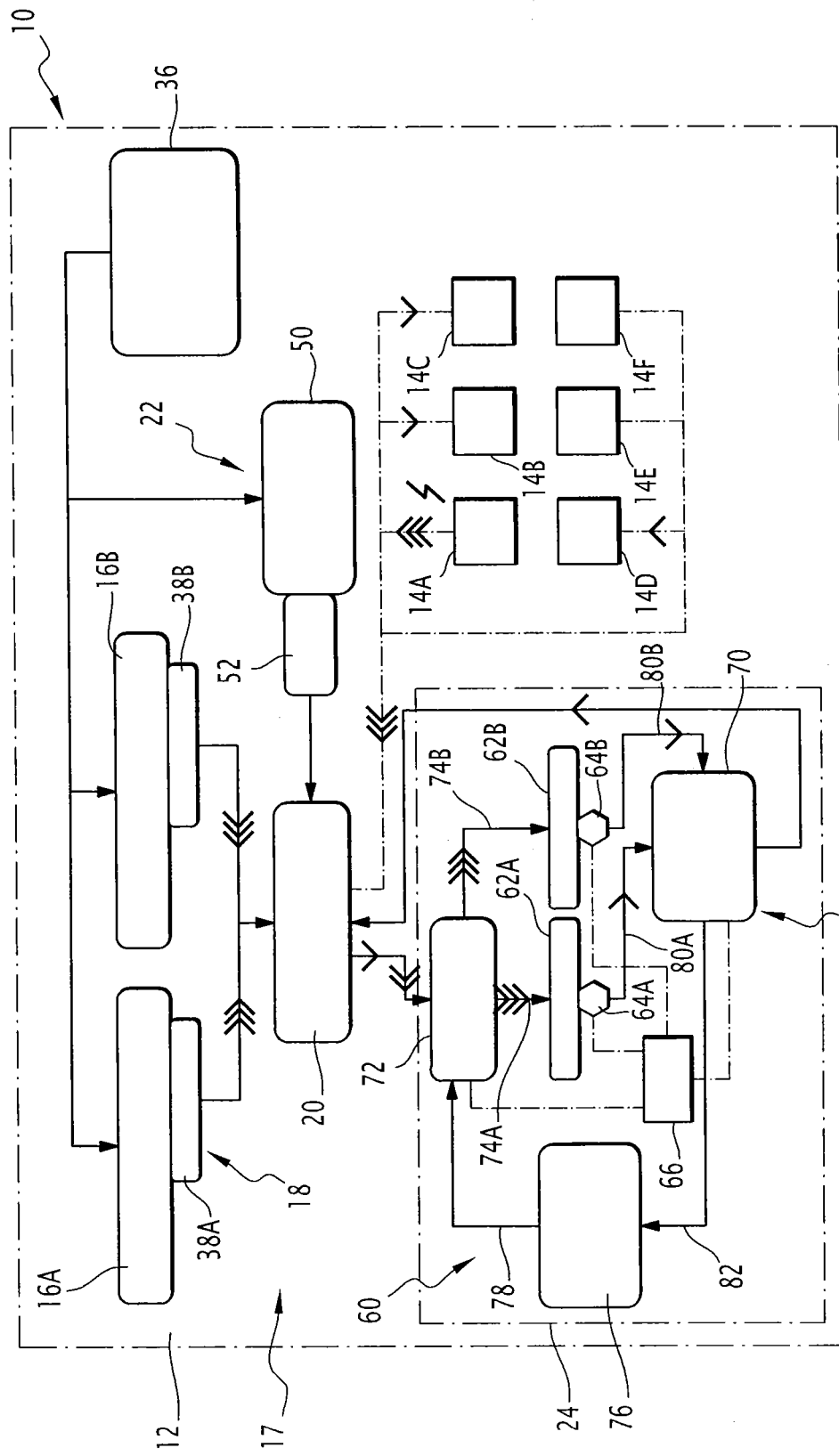
FIG. 2 is a view similar to FIG. 1, the regulating assembly operating in a first regulating configuration during the injection of additional electric power on the electrical network.

In certain cases, as illustrated by FIG. 2, an additional electric power is periodically injected on the network 20, in particular when a functional equipment 14A to 14F enters a regenerating state, in which it creates a power reinjected on the network 20.

When this additional electric power is detected, the unit 66 transitions the assembly 24 into its first regulating configuration.

The additional electric power injected on the network 20 is then consumed by the conversion assembly 60 to electrically power the electrolyzer 72.

The electrolyzer 72 then produces a flow rate d2 of each supply fluid higher than the flow rate d1 necessary to supply the secondary source 58.

The excess supply fluid produced is stored in the reservoirs 62A, 62B, which causes an increase in the pressure in the reservoirs 62A, 62B.

The regulating members 64A and 64B are thus calibrated so that the pressure in the reservoirs can rise to a maximum pressure slightly below the maximum pressure that can be delivered by the electrolyzer 72. Beyond that pressure, the regulating members 64A, 64B are open to allow the fluids to flow outside the reservoirs 62A, 62B.

Furthermore, the flow rate d1 of each supply fluid delivered to the source 58 remains substantially identical to that delivered in the standby configuration, such that the electric power provided to the network 20 by the source 58 remains substantially identical.

Subsequently, the electric power available on the network 20 remains substantially constant and equal to the desired reference power.

Moreover, the additional electric power has been used by the electrolyzer 72 to produce the supply fluids of the source 58, which are stored in the reservoirs 62A, 62B and make up a chemical potential energy reserve.

This chemical potential energy can then be used at a later time to produce an additional electric power to be provided to the network 20, for example when the load increases on the network and/or when the power provided by one and/or the other of the generating assemblies 18, 22 decreases.

Figure 3:
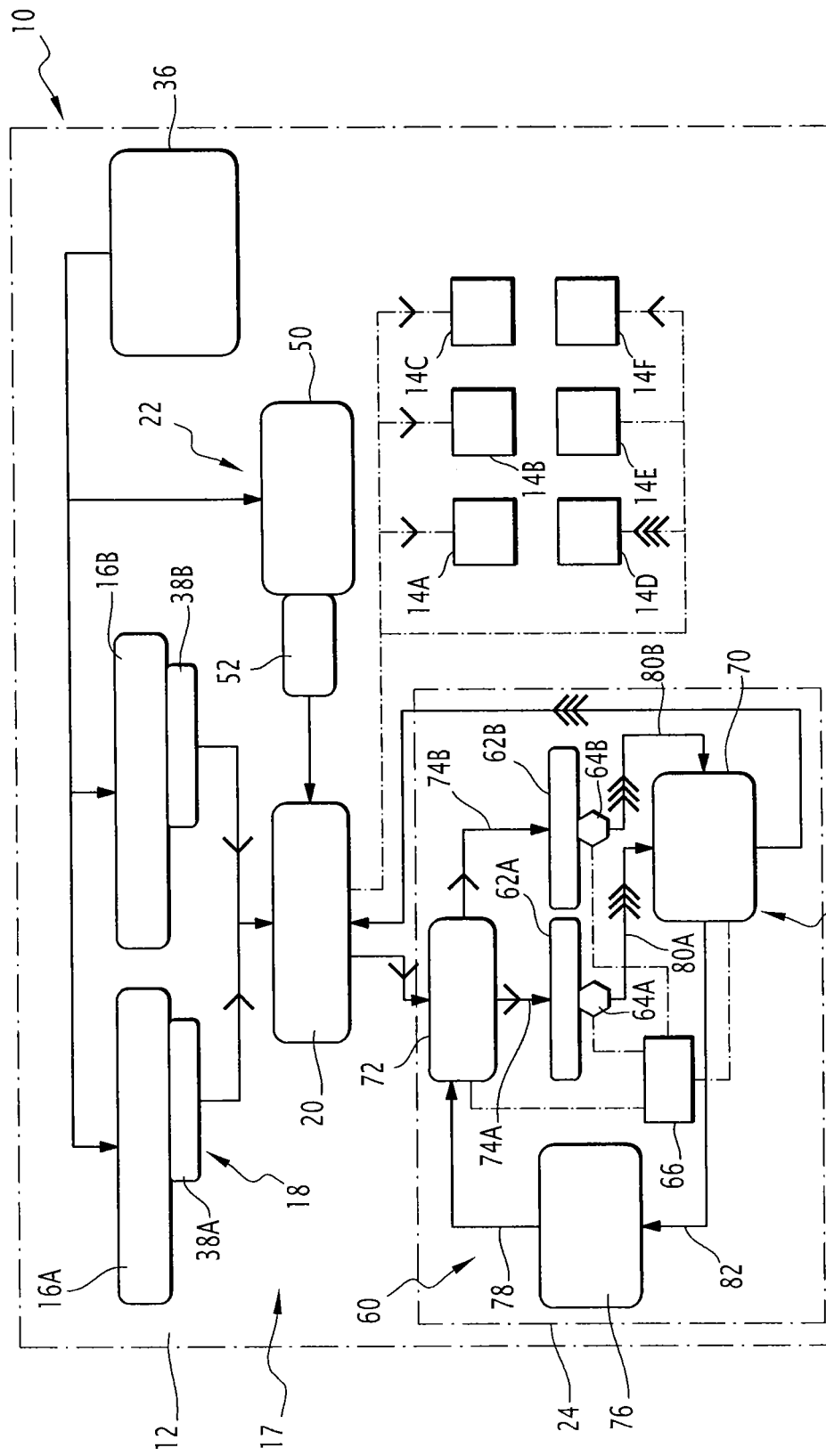
FIG. 3 is a view similar to FIG. 1, the regulating assembly operating in the second regulating configuration to restore electrical power to the electrical network.

When the electric network 20 must receive an additional electric power, the regulating assembly 24 enters its second regulating configuration, illustrated by FIG. 3.

In this configuration, the unit 66 opens the control members 64A, 64B to provide the source 58 with a flow rate d2 of each fluid higher than the flow rate d1 provided in the standby configuration or in the first regular in configuration.

The quantity of supply fluid contained in each reservoir 62A, 62B then decreases, as the supply fluid is consumed by the source 58.

The secondary source 58 produces, from the supply gas received from each reservoir 62A, 62B, a second electric regulating power P2 higher than the first standby power P1. This power P2 is for example greater than 100 W.

The electric power P2 is then provided to the network 20 and makes it possible to participate in power generation within the network.

This additional electric power P2 reduces the quantity of power that must be provided by the main assembly 18, and therefore decreases the quantity of fuel consumed by the engines from the reservoir 36 to provide that power.

The electric system 17 according to the invention therefore makes it possible to absorb the electric overpowers present periodically on the network 20, to use that electric power to convert it into at least one supply fluid that can be used in a secondary electric power source 58, then to restore additional electric power to the network 20, as needed.

The system 17 operates continuously during flight, since the source 58 is continually kept under operating conditions.

The system 20 according to the invention does not require continuously storing specific reagents in the aircraft 10, or providing one or more additional fuel reservoirs.

The only service necessary for operation of the system 17 is an electrolyzer fluid, which is preferably water. The system 17 does not require complex chemical operations such as fuel reforming, and does not create excess mass, or filling demands before each flight.

Unlike the electrical systems of the state of the art, the excess power periodically present on the network is not converted into heat and is not lost, but is on the contrary converted into chemical potential energy that can be used later to create the electric power that will be provided to the electrical network of the aircraft.

The system according to the invention thus makes it possible to improve the overall energy output of the aircraft and to make optimal use of the energy produced by the logistical supports capable of reinjecting power on the network of the aircraft.

The electrical system 17 according to the invention therefore does away with the heat dissipating devices that are integrated into the functional electrical equipment of the state of the art, such as the discharge resistances and the monitoring units of those resistances. This lightens the mass of the electrical system, and therefore of the aircraft.

The overall energy balance of the aircraft 10 is therefore greatly improved.

Alternatively, when the electrical network 20 of the airplane operates in AC current, the system 17 according to the invention remains operational by positioning an inverter between the conversion assembly 60 and the electrical network 20, for example at the cell 70.

The invention claimed is:

1. An aircraft electrical system, comprising:
   an electrical network, designed to electrically power at least one functional equipment of the aircraft;
   a regulating assembly capable of maintaining a desired electrical power on the electrical network, the desired electrical power being provided by at least one electricity generating assembly of the aircraft, the electricity generating assembly being coupled to at least an engine of the aircraft;
   wherein the regulating assembly includes:
   a secondary electrical power source;
   a conversion assembly for additional electrical power injected on the electrical network, the conversion assembly is configured, in a first electrical regulating configuration, to consume the additional electrical power present on the electrical network to create at least one supply fluid for a secondary source;
   a reservoir for each supply fluid, inserted between the conversion assembly and the secondary source to collect the supply fluid produced by the conversion assembly,
   wherein the secondary source is formed by a fuel cell,
   wherein the conversion assembly includes an electrolyzer, and
   wherein the regulating assembly can be driven between:
   a standby configuration, in which the secondary source is supplied by a first supply fluid flow rate coming from each reservoir to produce a first standby electrical power,
   the first electrical regulating configuration, and
   a second electrical regulating configuration,
   and in the second regulating configuration, the secondary source is supplied by a second supply fluid flow rate coming from each reservoir, the second flow rate being higher than the first flow rate to produce a second electrical regulating power higher than the first standby electric power.

2. The system according claim 1, wherein the secondary source is electrically connected to the electrical network to reinject, on the electrical network, additional electrical power produced from the or each supply fluid in the second electrical regulating configuration.

3. The system according claim 1, wherein the conversion assembly is capable of producing at least two supply fluids of the secondary source, the system including a separate reservoir for each supply fluid.

4. The system according to claim 1, wherein it includes the functional equipment connected to the electrical network, the functional equipment being capable of switching between an active state, in which it withdraws electric power on the network, and a regenerating state, in which it injects additional electric power on the electric network.

5. The system according to claim 4, wherein the functional equipment is chosen from among an actuator, in particular an electromechanical actuator, the actuator advantageously being designed to move flying controls, such as control surfaces or flaps, or being designed to actuate landing systems of the aircraft such as the opening/closing of hatches, the deployment/retraction of the landing gear or the electric driving of the landing gear for its ground movement function.

6. The system according to claim 1, wherein the regulating assembly includes, between each reservoir and the secondary source, a regulating member for the supply fluid flow rate distributed from the reservoir toward the secondary source.

7. An electricity management method for an aircraft, comprising:
   maintaining a desired electrical power on an electrical network by a regulating assembly, the desired electrical power being provided by at least one electricity generating assembly of the aircraft, the electricity generating assembly being coupled to at least an engine of the aircraft;
   supplying electricity for at least one functional equipment of the aircraft electrically connected to the electrical network,
   wherein the method includes the following phases:
   injecting additional electrical power on the electrical network;
   consuming the additional electric power present on the electrical network by a conversion assembly electrically connected to the electrical network to create at least one supply fluid for a secondary electric power source; and
   storing the or each supply fluid of the secondary source in at least one reservoir,
   wherein the secondary source is formed by a fuel cell,
   wherein the conversion assembly includes an electrolyzer, wherein it includes a step for reinjecting additional electric power on the electrical network through a secondary electric power source, the reinjection step including providing at least one supply fluid coming from each reservoir to the secondary source, producing electric power from each supply fluid by the secondary source, and injecting the electric power produced by the secondary source on the electrical network, and wherein in a first reinjection step, the secondary source is supplied by a first supply fluid flow rate coming from each reservoir and produces a first standby electric power, and in that in a second reinjection step, the secondary source is supplied by a second supply fluid flow rate coming from each reservoir, the second flow rate being higher than the first flow rate to produce a second electric regulating power higher than the first electric standby power.

8. The method according to claim 7 wherein during the supply step, the functional equipment is in an active state, in which it withdraws electric power from the electrical network, and during the injection step, the functional equipment is in a regenerating state wherein it injects the additional electric power on the electrical network.

9. The method according to claim 7, wherein the secondary source is formed by a fuel cell, the production of electric power resulting from the generation of an electron current in the fuel cell.

10. The method according to claim 7, wherein during the consumption step, the electric power consumed is used by the conversion assembly to electrolyze a starting fluid and form each supply fluid.

11. The system according claim 1, wherein each reservoir is connected to a respective output duct, and is further connected to the fuel cell by a respective downstream duct.

12. An aircraft electrical system, comprising:
an electrical network, designed to electrically power at least one functional equipment of the aircraft;
a regulating assembly capable of maintaining a desired electrical power on the electrical network, the desired electrical power being provided by at least one electricity generating assembly of the aircraft,
wherein the regulating assembly includes:
a secondary electrical power source;
a conversion assembly for additional electrical power injected on the electrical network, the conversion assembly is configured, in a first electrical regulating configuration, to consume the additional electrical power present on the electrical network to create at least one supply fluid for a secondary source;
a reservoir for each supply fluid, inserted between the conversion assembly and the secondary source to collect the supply fluid produced by the conversion assembly,
wherein the regulating assembly can be driven between:
a standby configuration, in which the secondary source is supplied by a first supply fluid flow rate coming from each reservoir to produce a first standby electrical power,
the first regulating configuration, and
a second regulating configuration, and in the second regulating configuration, the secondary source is supplied by a second supply fluid flow rate coming from each reservoir, the second flow rate being higher than the first flow rate to produce a second electrical regulating power higher than the first standby electric power.

13. An electricity management method for an aircraft, comprising:
maintaining a desired electrical power on an electrical network by a regulating assembly, the desired electrical power being provided by at least one electricity generating assembly of the aircraft;
supplying electricity for at least one functional equipment of the aircraft electrically connected to the electrical network,
wherein the method includes the following phases:
injecting additional electrical power on the electrical network;
consuming the additional electric power present on the electrical network by a conversion assembly electrically connected to the electrical network to create at least one supply fluid for a secondary electric power source;
storing the or each supply fluid of the secondary source in at least one reservoir,
wherein in a first reinjection step, the secondary source is supplied by a first supply fluid flow rate coming from each reservoir and produces a first standby electric power, and in that in a second reinjection step, the secondary source is supplied by a second supply fluid flow rate coming from each reservoir, the second flow rate being higher than the first flow rate to produce a second electric regulating power higher than the first electric standby power.

* * * * *